(12) United States Patent
Loccufier et al.

(10) Patent No.: US 11,884,829 B2
(45) Date of Patent: *Jan. 30, 2024

(54) AQUEOUS INKS COMPRISING CAPSULES STABILISED BY CATIONIC DISPERSING GROUPS

(71) Applicant: AGFA NV, Mortsel (BE)

(72) Inventors: Johan Loccufier, Mortsel (BE); Luc Decoster, Mortsel (BE)

(73) Assignee: Agfa NV, Mortsel (BE)

( * ) Notice: Subject to any disclaimer, the term of this patent is extended or adjusted under 35 U.S.C. 154(b) by 383 days.

This patent is subject to a terminal disclaimer.

(21) Appl. No.: 17/292,615

(22) PCT Filed: Oct. 24, 2019

(86) PCT No.: PCT/EP2019/079086
§ 371 (c)(1),
(2) Date: May 10, 2021

(87) PCT Pub. No.: WO2020/094414
PCT Pub. Date: May 14, 2020

(65) Prior Publication Data
US 2022/0002568 A1    Jan. 6, 2022

(30) Foreign Application Priority Data
Nov. 9, 2018   (EP) .................... 18205357

(51) Int. Cl.
| | | |
|---|---|---|
| *C09D 11/36* | (2014.01) |
| *D06P 5/30* | (2006.01) |
| *C09D 11/10* | (2014.01) |
| *B41J 2/21* | (2006.01) |
| *C09D 11/322* | (2014.01) |

(52) U.S. Cl.
CPC ............ *C09D 11/36* (2013.01); *B41J 2/2107* (2013.01); *C09D 11/10* (2013.01); *C09D 11/322* (2013.01); *D06P 5/30* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | |
|---|---|---|
| 5,853,861 A | 12/1998 | Held |
| 2006/0093761 A1 | 5/2006 | Chen |
| 2009/0079790 A1 | 3/2009 | Mizutani |
| 2009/0226678 A1 | 9/2009 | Yatake et al. |
| 2010/0080911 A1 | 4/2010 | Okada |
| 2015/0299948 A1* | 10/2015 | Pan ............... B41M 5/0017 524/591 |
| 2017/0022379 A1* | 1/2017 | Loccufier ........... C09D 11/104 |
| 2017/0029637 A1* | 2/2017 | Loccufier ........... C09D 11/328 |
| 2017/0029639 A1* | 2/2017 | Loccufier ........... B01J 13/06 |
| 2017/0218565 A1* | 8/2017 | Loccufier ........... D06P 5/30 |
| 2019/0367760 A1* | 12/2019 | Loccufier ........... B41M 5/0047 |
| 2019/0367761 A1* | 12/2019 | Loccufier ........... B41M 7/009 |
| 2019/0367762 A1* | 12/2019 | Loccufier ........... C09D 11/037 |

FOREIGN PATENT DOCUMENTS

| | | |
|---|---|---|
| EP | 2933374 A1 | 10/2015 |
| WO | 03/029362 A2 | 4/2003 |
| WO | 2009/137753 A1 | 11/2009 |
| WO | 2018/137993 A1 | 8/2018 |
| WO | 2018/138069 A1 | 8/2018 |

OTHER PUBLICATIONS

International Search Report dated Jan. 15, 2020 relating to PCT/EP2019/079086, 3 pages.
Written Opinion dated Jan. 15, 2020 relating to PCT/EP2019/079086, 6 pages.
Zhang, Yufen et al., Characterisation and applications of microcapsules obtained by interfacial polycondensation, Journal of Microencapsulation, (2012); 29(7), pp. 636-649.
Salaun, Fabien, Microencapsulation by Interfacial Polymerization, Chapter 5: Encapsulation Nanotechnologies (2013), pp. 137-174.

* cited by examiner

*Primary Examiner* — Manish S Shah
(74) *Attorney, Agent, or Firm* — Leydig, Voit & Mayer, Ltd.

(57) ABSTRACT

An aqueous ink comprising a dispersion of a capsule composed of a polymeric shell surrounding a core, the core includes one or more chemical reactants capable of forming a reaction product upon application of heat and/or radiation, the shell is stabilized by cationic dispersing groups and a colorant stabilised by cationic dispersing groups.

16 Claims, No Drawings

AQUEOUS INKS COMPRISING CAPSULES STABILISED BY CATIONIC DISPERSING GROUPS

REFERENCE TO RELATED APPLICATIONS

This application is a 371 National Stage Application of PCT/EP2019/079066, filed Oct. 24, 2019, which claims the benefit of European Application No. 18205357.9, filed Nov. 9, 2018, the contents of which are incorporated by reference herein in their entirety.

TECHNICAL FIELD

The present invention relates to aqueous inks comprising a dispersion of capsules, such as microcapsules or nanocapsules for use in digital printing.

BACKGROUND ART

In recent years, inkjet techniques have been increasingly utilized for industrial printing applications such as displays, posters, bulletin boards, packaging, textile, etc. In such applications durability such as light fastness, water resistance, and wear resistance are important requirements of the printed images and pigment based inks therefore have been developed.

Inks, such as solvent-based inkjet inks using an organic solvent as a vehicle and ultraviolet curable inkjet inks including a polymerisable monomer as a main component have been used widely in industrial applications.

However, the solvent-based inkjet inks are not environmentally preferable because the solvent of the ink is evaporated in the air upon drying. The ultraviolet curable inkjet inks have limited application fields because they may have skin sensitizing properties depending on the monomer used and an expensive ultraviolet irradiation apparatus is required to be incorporated to the main body of a printer.

In view of such background, there have been developed pigment based aqueous inks for inkjet recording capable of being directly used for printing on porous and non-porous substrates and which give less environmental load. These inks are characterized by the presence of a resin which binds the pigments and prevents rubbing off the images from the substrate leading to an improved solvent and scratch resistance.

Especially, on non-porous substrates aqueous based pigment inks tend to give low image quality due to the slow evacuation of the aqueous ink carrier leading to migration of colorants, known as inter-colour bleeding, coalescence, etc. . . . . On porous substrates such as paper, cardboard and textile fabrics, colorants also tend to migrate before the aqueous carrier is completely absorbed by the porous material. A lot of these substrate materials have a negative zeta-potential in water with a pH range around 7. As most colorants in aqueous inkjet inks carry a negative charge, hardly any fixing of these colorants on the negatively charged substrate material occurs before the ink carrier is evacuated.

Therefore, ink-jet recording media for aqueous ink jet inks such as paper, plastic film or textile fabric are provided with an ink-jet receiving layer provided thereon.

This layer is formed from an ink-jet receiving agent which is mostly a water soluble resin such as polyvinyl alcohol, polyvinyl pyrrolidone and the like and any of various additives, in order to prevent bleeding and coalescence caused by the water based ink or improve ink absorbing property. Image quality problems occur because bleeding and coalescence arises due to insufficient adsorption of the pigment ink into the ink-jet receiving layer.

Moreover, there is a problem that a printed image made by jetting aqueous ink jet inks has poor waterproof characteristics. The most popular method to improve the waterproof characteristics is a method wherein an ink-jet receiving agent is used which includes an aqueous cationic resin such as a poly(diallyldimethylammonium chloride) in addition to the aforementioned resin in the ink. Waterproof characteristics can be improved by fixing of the pigment of the aqueous ink due to the electrostatic bonding between an anionic group of the pigment in the ink and a cationic group of the water-soluble cationic resin. However, since the water-soluble cationic resin itself tends to be easily dissolved in water, the effect for improving waterproof characteristics was insufficient. Furthermore, these polymers do not crosslink with each other nor form a film, leading to poor physical properties of the printed image.

WO14042652 discloses a fixer fluid to be used for making an ink-receiving layer and comprising a liquid vehicle, a surfactant, and a cationic polymer. The cationic polymer can be selected from the group of quaternized polyamines, dicyandiamide polycations, diallyldimethyl ammonium chloride copolymers, quaternized dimethylaminoethyl (meth)acrylate polymers, quaternized vinylimidazol polymers, alkyl guanidine polymers, alkoxylated polyethylene imines, JP2015163678A discloses an aqueous pigment composition for printing on a porous substrate such as textile which guarantees an improved washing fastness and rubbing resistance of the images on the fabric. The aqueous composition comprises pigment particles containing a urethane resin obtained by reacting polyester polyols with polyols comprising an ionic or non-ionic group and polyisocyanate.

From the above, there is a great need for the development of an aqueous pigmented ink which does not require the use of a pre-treatment layer or ink receptive layer onto the substrate. WO2018/138069 discloses an inkjet ink suitable for digital textile printing which comprises capsules including reactive chemistry in the core and which is stably dispersed by cationic dispersing groups. However, the storage stability of the aqueous inks comprising a colorant together with capsules is still to be improved.

SUMMARY OF INVENTION

It is the objective of the present invention to provide a solution to the storage stability problems of aqueous pigment inks containing capsules including reactive chemistry. The objective has been achieved by providing an aqueous ink comprising capsules which are stabilised by means of cationic dispersing groups and further comprising a colorant also stabilised by means of cationic dispersing groups as defined in claim 1.

It is another embodiment of the invention to provide an inkjet recording method as defined in claim 10.

It is another embodiment of the invention to provide a method of preparing cationic capsules as defined in claim 12.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Aqueous Ink

A.1. Capsules Having an Additional Cross-Linked Polymeric Shell

A.1.1. Method of Preparation

The preparation method of the capsules contained in the aqueous ink of the invention, is preferably via a polymerization method more preferably via interfacial polymerization where in an extra crosslinking agent is used to prepare the capsules included in the inventive inks. The technique of interfacial polymerisation is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

In interfacial polymerization, such as interfacial polycondensation, leading to capsules included in the inventive ink composition, three reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component in e.g. the oleophilic phase) that is capable of reacting with another monomer (a second shell component) and a crosslinking agent dissolved in the other phase, e.g. the aqueous phase. Upon polymerisation, a polymer is formed that is insoluble in both the aqueous and the oleophilic phase and wherein the polymer is also cross-linked. As a result, the formed polymer has not only the tendency to precipitate at the interface of the oleophilic and aqueous phase, hereby forming a shell around the dispersed phase, but also to lead to a polymeric shell which is substantially less flexible than when no additional crosslinking agent is used. The capsules according to the present invention are preferably prepared from an oleophilic dispersion in an aqueous continuous phase.

The crosslinking agent, preferably added after the formation of the dispersion, more preferably added to the aqueous continuous phase, is a compound having at least three nucleophilic groups which are capable of reacting with the first shell component such as, an amine group, a hydroxyl group, a thiol group, a hydrazide group or a sulfonylhydrazide group. Preferable polyamines are used together with a di- or oligoisocyanate as first shell component, more preferably an alkylene pentamine with a di- or oligocyanate as first shell component. Preferably, the crosslinking agent is added once the oleophilic dispersion in an aqueous continuous phase is formed or vice versa.

A.1.2. Polymeric Shell

Typical polymeric shells, formed by interfacial polymerisation are selected from the group consisting of polyamides, typically prepared from di- or poly-acid chlorides as first shell component and di- or oligoamines as second shell component, polyurea, typically prepared from di- or oligoisocyanates as first shell component and di- or oligoamines as second shell component, polyurethanes, typically prepared from di- or oligoisocyanates as first shell component and di- or oligoalcohols as second shell component, polysulfonamides, typically prepared from di- or oligosulfochlorides as first shell component and di- or oligoamines as second shell component, polyesters, typically prepared from di- or oligo-acid chlorides as first shell component and di- or oligoalcohols as second shell component and polycarbonates, typically prepared from di- or oligo-chloroformates as first shell component and di- or oligoalcohols as second shell component. The shell can be composed of combinations of these polymers.

In a further embodiment, polymers, such as gelatine, chitosan, albumin and polyethylene imine can be used as second shell components in combination with a di- or oligo-isocyanate, a di- or oligo acid chloride, a di- or oligo-chloroformate and an epoxy resin as first shell component.

In a particularly preferred embodiment, the shell is composed of a polyurethane, a polyurea or a combination thereof.

In a further preferred embodiment, a water immiscible solvent is used in the dispersion step, which is removed by solvent stripping after the shell formation. In a particularly preferred embodiment, the water immiscible solvent has a boiling point below 100° C. at normal pressure. Esters are particularly preferred as water immiscible solvent.

All of these shell polymers are additionally cross-linked due to the presence of the additional crosslinking agent as described above in § A.1.1. The presence of the additional crosslinking agent, decreases the distance between the anchors of the cross-linked polymeric shell, leading to a more rigid polymeric shell. Although with multifunctional first shell components, crosslinking may already occur, the effect of the presence of an additional crosslinking agent on the storage stability of the aqueous ink comprising capsules with extra cross-linked polymeric network in the shell is substantial.

In a further preferred embodiment, said nanocaps is a selfdispersing cationic nanocaps. A selfdispersing nanocap is defined as a nanocapsule where the cationic dispersing groups responsible for colloid stability are covalently coupled to the shell.

The cationic dispersing groups which make part of the shell of the nanocapsule of the invention are preferably selected from protonated amines, protonated nitrogen containing heteroaromatic compounds, quaternized tertiary amines, N-quaternized heteroaromatic compounds, sulfoniums and phosphoniums, quaternized tertiary amines and N-quaternized heteroaromatic compounds being more preferred. In a further preferred embodiment, the cationic dispersing group is a quaternary ammonium group, a tetraalkyl ammonium group being particularly preferred. In a more preferred embodiment the quaternary ammonium group is covalently coupled to the shell of the capsules according to the present invention. In a particularly preferred embodiment the cationic dispersing group is covalently coupled to the shell of the capsules according to the present invention by reaction of a surfactant comprising at least one primary or secondary amine group and at least one quaternary ammonium group with a compound selected from the group of di- or poly-acid chlorides, di- or oligoisocyanates, di- or oligosulfochlorides, di- or oligo-chloroformates and an isocyanate monomer of the shell. More preferably the surfactant comprising at least one primary or secondary amine group and at least one quaternary ammonium group reacts with an isocyanate monomer of the shell. The surfactant is characterised in that the hydrophilic group comprises the at least one primary or secondary amine group and the at least one quaternary ammonium group. The hydrophobic group of the surfactant may be any hydrophobic group, but is preferably a substituted or unsubstituted alkyl group, a substituted or unsubstituted alkenyl group or a substituted or unsubstituted alkynyl group, all having at least eight carbon atoms. The advantage of using a surfactant to obtain a shell comprising cationic dispersing groups, is that the emulsifying function of the surfactant can stabilize the oleophilic phase in the continuous aqueous phase during the preparation of the capsule. (see 3$^{rd}$ paragraph of § A.1.1.)

In an even more preferred embodiment said surfactant is a surfactant according to General Formula I

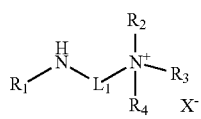

General Formula I wherein $R_1$ is selected from the group consisting of a substituted or unsubstituted alkyl group, a substituted or unsubstituted alkenyl group and a substituted or unsubstituted alkynyl group with the proviso that $R_1$ comprises at least eight carbon atoms;

$R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubsituted alkaryl group and a substituted or unsubstituted (hetero)aryl group $L_1$ represents a divalent linking group comprising no more than eight carbon atoms;

X represents a counterion to compensate the positive charge of the ammonium group.

Surfactants according to General Formula II are particularly preferred.

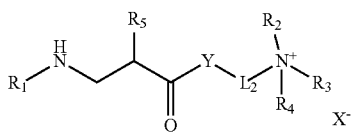

General Formula II wherein $R_1$, $R_2$, $R_3$, $R_4$ an X are defined as in general formula I $R_5$ represents a hydrogen or a methyl group Y is selected from the group consisting of an oxygen atom and $NR_6$ $R_6$ is selected from the group consisting of a hydrogen and a substituted or unsubstituted alkyl group $L_2$ represents a substituted or unsubstituted alkylene group.

In a more preferred embodiment, $R_1$ comprises at least ten carbon atoms and most preferably at least twelve carbon atoms. In a further preferred embodiment $R_2$, $R_3$ and $R_4$ independently represent a lower alkyl group, a methyl and an ethyl group being particularly preferred. In another preferred embodiment Y represents NH.

Specific examples of surfactants according to General Formula I and General Formula II are given below without being limited thereto.

TABLE 1

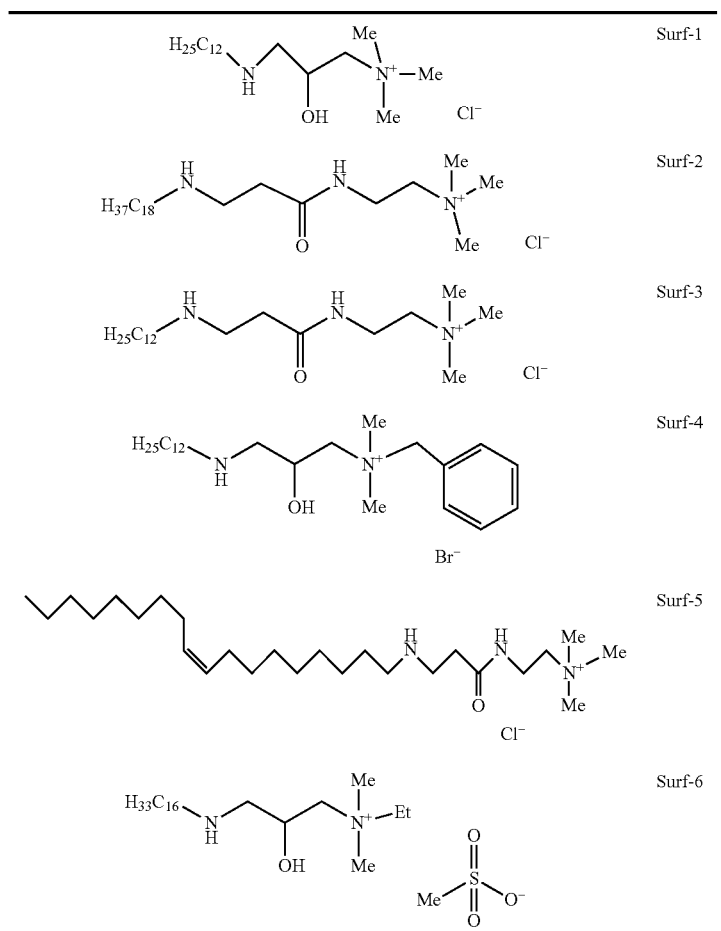

TABLE 1-continued

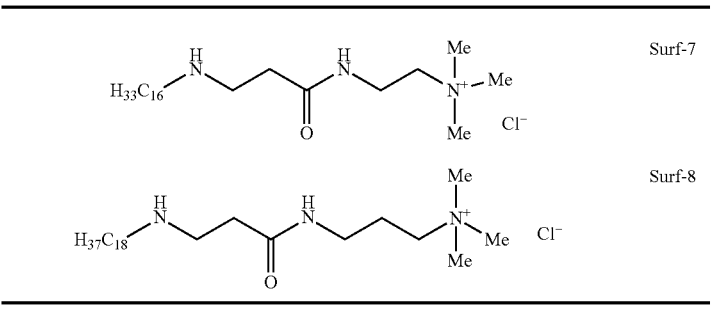

Surf-7

Surf-8

A.1.3. Core of the Capsule
A.1.3.1. Thermal Reactive Chemistry

The core of the capsules in the ink of the invention may comprise one or more chemical reactants including a thermally curable compound. The thermally curable compound is preferably a low molecular, oligomer or polymer compound functionalized with at least one functional group selected from the group consisting of an epoxide, an oxetane, an aziridine, an azetidine, a ketone, an aldehyde, a hydrazide and a blocked isocyanate. In a further preferred embodiment, the thermally curable compound or thermally reactive chemistry is selected from the group consisting of an optionally etherified condensation product of formaldehyde and melamine, an optionally etherified condensation product of formaldehyde and ureum and a phenol formaldehyde resin, preferably a resole.

The thermally reactive chemistry can be a one component or a two component system. A one component system is defined as a reactive system that is capable of forming a polymeric resin or cross-linked network by reacting on its own upon thermal activation. A two component system is defined as a reactive system that is capable of forming a polymeric resin or crosslinked network by reacting with a second component in the system upon thermal activation, also called the thermally reactive crosslinker.

Thermally reactive crosslinkers preferably comprise at least two functional groups selected from the group consisting of an epoxide, an oxetane, an aziridine, an azetidine, a ketone, an aldehyde, a hydrazide and a blocked isocyanate. In a further preferred embodiment, the thermally reactive crosslinker is selected from the group consisting of an optionally etherified condensation product of formaldehyde and melamine, an optionally etherified condensation product of formaldehyde and ureum and a phenol formaldehyde resin, preferably a resole with the proviso that the crosslinker contains at least two thermally reactive groups.

Blocked isocyanates are particularly preferred as thermally reactive crosslinker. Synthesis of blocked isocyanates is well-known to the skilled person and has been reviewed by Wicks D. A. and Wicks Z. W. Jr. (Progress in Organic Coatings, 36, 148-172 (1999)) and Delebecq et al. (Chem; Rev., 113, 80-118 (2013)). Classic blocked isocyanates are defined as chemical components that are capable of forming isocyanates from a precursor upon thermal treatment. In general, the reaction can be summarized as given in scheme 1 below.

Scheme 1

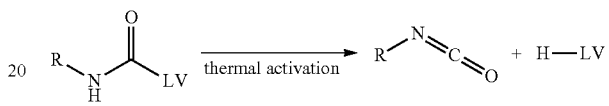

LV Represents a Leaving Group

The activation temperature, also called deblocking temperature, is dependent on the leaving group and is selected dependent on the application. Suitable isocyanate precursors are given below having a variable deblocking temperature between 100° C. and 160° C.

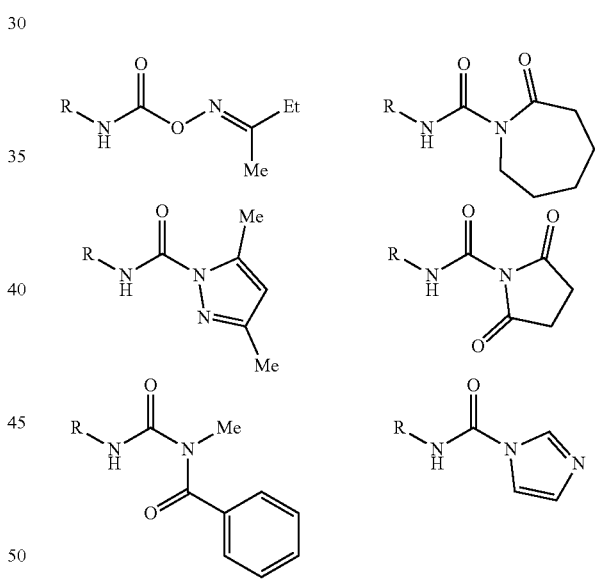

In the above six isocyanate precursors, R represents the residue of a difunctional, multifunctional or polymeric blocked isocyanate. Difunctional and multifunctional blocked isocyanates are preferred. In a further preferred embodiment, R represents a hydrocarbon group, further functionalized with at least one and preferably two or more blocked isocyanates, where the blocked isocyanates can be the same as or different from the first blocked isocyanate listed above. The hydrocarbon group preferably comprises no more then 40 carbon atoms, more preferably no more then 30 carbon atoms and most preferably between 8 and 25 carbon atoms. The same blocked isocyanate functional groups as the first blocked isocyanate are preferred. In a further preferred embodiment R comprises aliphatic, cycloaliphatic or aromatic fragments or combinations thereof.

Preferred aliphatic fragments are linear or branched saturated hydrocarbon chains comprising 2 to 12 carbon atoms. Preferred cycloaliphatic fragments are five or six membered saturated hydrocarbon rings, six membered hydrocarbon rings being particularly preferred. Preferred aromatic fragments are selected from the group consisting of phenyl rings and naphtyl rings, phenyl rings being particularly preferred. In a particularly preferred embodiment R comprises at least one fragment selected from the group consisting of a [1,3,5]triazinane-2,4,6-trione fragment and a biuret fragment.

Active methylene compounds as blocking agents are widely used as alternatives for classic blocked isocyanates, operating via an alternative reaction pathway, not yielding an intermediate isocyanate but crosslinking the system via ester formation as disclosed in Progress in Organic Coatings, 36, 148-172 (1999), paragraph 3.8. Suitable examples of active methylene group blocked isocyanates are given below:

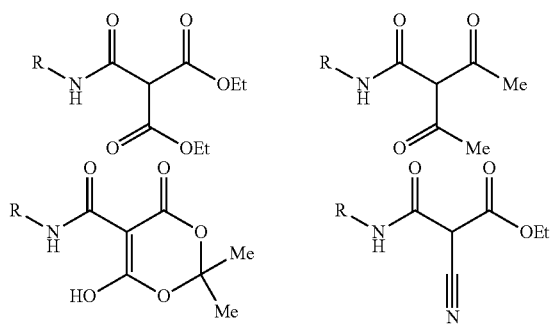

In the above four compounds, R represents the residue of a difunctional, mulfifunctional or polymeric blocked isocyanate or active methylene group blocked isocyanate. Difunctional and multifunctional blocked isocyanates or active methylene group blocked isocyanates are preferred. In a further preferred embodiment, R represents a hydrocarbon group, further functionalized with at least one and preferably two or more blocked isocyanates or active methylene group blocked isocyanates, where the blocked isocyanates can be the same as or different from the first active methylene group blocked isocyanate listed above. The hydrocarbon group preferably comprises no more then 40 carbon atoms, more preferably no more then 30 carbon atoms and most preferably between 8 and 25 carbon atoms. Di- or multifunctional active methylene group blocked isocyanates are preferred, all blocking functional groups being the same being particularly preferred. In a further preferred embodiment R comprises, aliphatic, cycloaliphatic or aromatic fragments or combinations thereof. Preferred aliphatic fragments are linear or branched saturated hydrocarbon chains comprising 2 to 12 carbon atoms. Preferred cycloaliphatic fragments are five or six membered saturated hydrocarbon rings, six membered hydrocarbon rings being particularly preferred. Preferred aromatic fragments are selected from the group consisting of phenyl rings and naphtyl rings, phenyl rings being particularly preferred. In a particularly preferred embodiment R comprises at least one fragment selected from the group consisting of a [1,3,5]triazinane-2,4,6-trione fragment and a biuret fragment.

In a preferred embodiment, the blocked isocyanate is a polyfunctional blocked isocyanate having two to six blocked isocyanate functions. Tri- and tetrafunctional blocked isocyanates are particularly preferred. Preferred blocked isocyanates are precursors capable of forming a di- or multifunctional isocyanate upon thermal activation selected from the group of hexamethylene diisocyanate, isophorone diisocyanate, tolyl diisocyanate, xylylene diisocyanate, a hexamethylene diisocyanate trimer, trimethylhexylene diisocyanate, diphenylmethane diisocyanate, dicyclohexylmethane diisocyanate and condensation products of one or more of the previous isocyanates. Other preferred blocked isocyanates are derivatives from the Takenate™ series of isocyanates (Mitsui), the Duranate™ series (Asahi Kasei Corporation) and the Bayhydur™ series (Bayer AG).

Suitable blocked isocyanates can be selected from the Trixene™ series (Baxenden Chemicals LTD) and the Bayhydur™ series (Bayer AG). Preferred examples of blocked isocyanates are given below in without being limited thereto.

TABLE 2

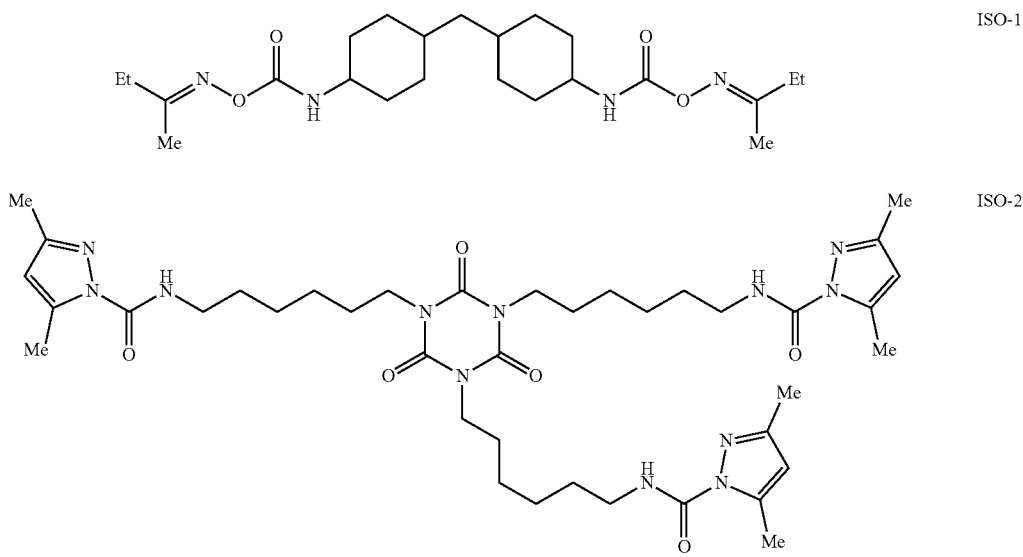

TABLE 2-continued
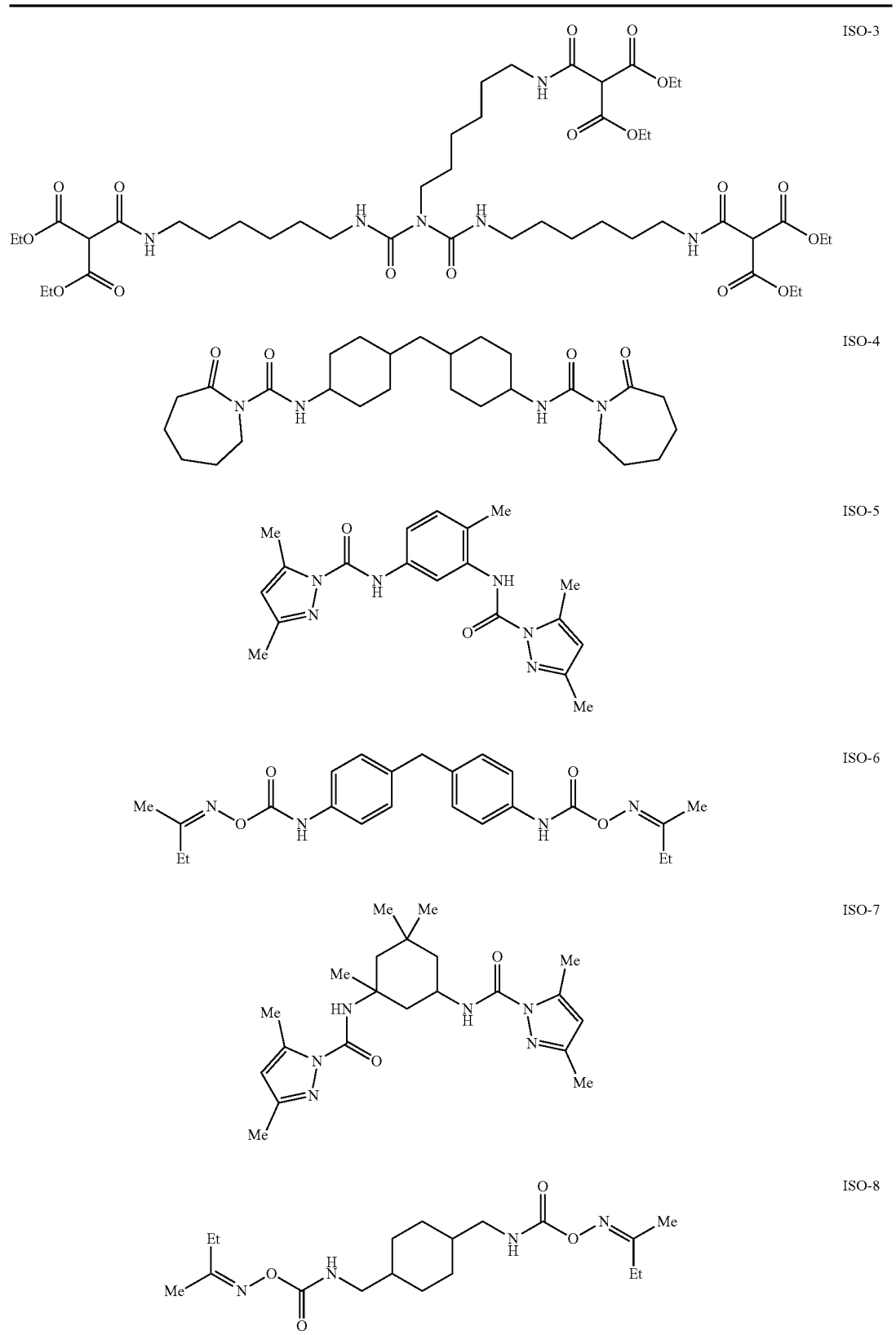

TABLE 2-continued

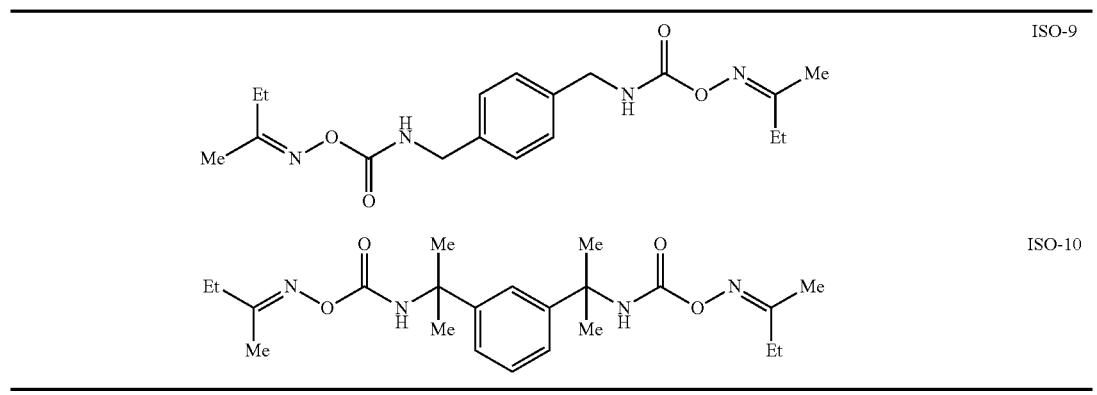

In the more preferred embodiment, said blocked isocyanate is derived from a di-, tri- or tetrafunctional isocyanate terminated oligomer, selected from the group of an isocyanate terminated oligo-ether, an isocyanate terminated oligo-ester, an isocyanate terminated oligocarbonate, an isocyanate terminated butadiene oligomer or hydrogenated butadiene oligomer, an isocyanate terminated isoprene oligomer, an isocyanate terminated silicone oligomer and combinations thereof.

In the most preferred embodiment, said blocked isocyanate has a structure according to General Structure III.

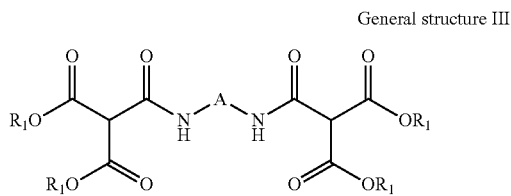

General structure III wherein $R_1$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group.

A represents a difunctional oligomeric group selected from the group consisting of an oligo-ether, an oligo-ester, an oligo-carbonate, a butadiene oligomer, a hydrogenated butadiene oligomer, an isoprene oligomer, a silicone oligomer and combinations thereof.

In a preferred embodiment said poly-ether oligomers preferably contain 3 to 50 repeating units, more preferably 5 to 40 repeating units and most preferably 6 to 30 repeating units. Said poly-ester based oligomer preferably contains 2 to 20 repeating units, more preferably 3 to 15 repeating units and most preferably 4 to 10 repeating units. Said polysiloxane based oligomer preferably contains 3 to 40 repeating units, more preferably 5 to 30 repeating units and most preferably 6 to 20 repeating units. Said polycarbonate based oligomer preferably contains 3 to 30 repeating units, more preferably 4 to 20 repeating units and most preferably 5 to 15 repeating units. Said polybutadiene, hydrogenated polybutadiene and polyisoprene based oligomers preferably contain 3 to 50 repeating units, 5 to 40 repeating units and most preferably 6 to 30 repeating units. Oligomers containing different oligomeric repeating units preferably contain 60 repeating units or less, more preferably 50 repeating units or less and most preferably 30 repeating units or less.

In a further embodiment, the dispersion according to the present invention may further comprise a catalyst to activate said thermally reactive chemistry. The catalyst is preferably selected from the group consisting of a Brönsted acid, a Lewis acid and thermal acid generator. Said catalyst can be present in the aqueous continuous phase, in the core of the capsule or in a separate dispersed phase.

The capsules are preferably present in the inkjet ink in an amount of no more than 30 wt. %, preferably between 5 and 25 wt. % based on the total weight of the ink.

A.1.3.2. Radiation Curable Reactive Chemistry

The reactive chemistry in the core may also be responsive to radiation, such as UV light. UV curable reactive chemistry contains one or more chemical reactants, such as a monomer, oligomer or polymer, which are curable by free radical polymerization or by cationic polymerization. In a preferred embodiment, the monomer, oligomer or polymer includes at least one acrylate group as polymerizable group.

In addition to the monomer, oligomer or polymer that are curable by free radical polymerization or by cationic polymerization in the core of the capsule, water soluble monomers and oligomers may also be included into the aqueous medium of the capsule dispersion.

The inkjet ink preferably includes at least one photoinitiator. Although water soluble or water dispersible photoinitiators may be used in the aqueous medium, preferably the at least one photoinitiator is present in the core of the capsule. Preferably also at least one co-initiator is present in the aqueous medium of the capsule dispersion. Similarly the at least one co-initiator may be present in the aqueous medium, but is preferably present in the core of the capsule Any polymerizable compound commonly known in the art may be employed. A combination of monomers, oligomers and/or polymers may be used. The monomers, oligomers and/or polymers may possess different degrees of functionality, and a mixture including combinations of mono-, di-, tri- and higher functionality monomers, oligomers and/or polymers may be used. Particularly preferred curable compounds to be incorporated in the core are disclosed in WO2015/158649 [0072-010].

A.2. Colorant Stabilised Via Cationic Dispersing Groups

The colorant included in the aqueous ink according to the invention can be a pigment or a disperse dye, preferably a pigment. Pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

To be included in the aqueous ink without precipitating or aggregating, the pigments are to be dispersed in an aqueous medium using a polymeric dispersant or a cationic surfactant. Also suitable are self-dispersible pigments. The latter prevents interaction of the polymeric dispersant with the dispersing groups of capsules which may be included in the inkjet ink (see below), since dispersion stability of the pigment is accomplished by the same technique of electrostatic stabilization as employed for the capsules.

A self-dispersible pigment is a pigment having on its surface covalently bonded cationic hydrophilic groups, such as salt-forming groups or the same groups used as dispersing groups for the capsules, that allow the pigment to be dispersed in an aqueous medium without using a surfactant or a resin.

The technology for making self-dispersible pigments is well-known. For example, EP1220879A discloses pigments having attached a) at least one steric group and b) at least one organic ionic group and at least one amphiphilic counterion, wherein the amphiphilic counterion has a charge opposite to that of the organic ionic group that are suitable for inkjet inks.

Also EP906371A discloses suitable surface-modified coloured pigment having attached hydrophilic organic groups containing one or more ionic groups or ionisable groups. Suitable cationic groups as ionic groups are disclosed in WO97/48769, p. 6.

In a preferred embodiment of the invention, the pigment is dispersed by using in an aqueous medium a dispersing agent comprising a structural moiety according to general structure IV

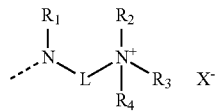

general strucrure IV wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group L represents a divalent linking group comprising 2 to 10 carbon atoms R2, R3 and R4 are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group Any of R1, R2, R3, R4 and L may represent the necessary atoms to form a five to eight membered ring X— represents an anion to compensate the positive charge of the ammonium group the dashed line represents the covalent bond to a carbon atom of the dispersing agent.

with the proviso that the nitrogen linked to R1 represents a secondary or tertiary amine.

In a preferred embodiment, the dispersing agent according to the present invention is represented by general structure V

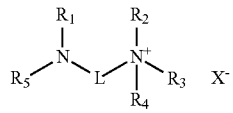

general strucrure V wherein

R5 represent a hydrocarbon group comprising at least 8 carbon atoms

R1, R2, R3, R4, L and X are defined as above.

In a preferred embodiment, R5 represents a substituted or unsubstituted alkyl group, comprising at least 8 carbon atoms, more preferably at least 10 carbon atoms and most preferably at least 12 carbon atoms. In a particularly preferred embodiment, R5 represents an unsubstituted alkyl group comprising at least 10 carbon atoms. In another preferred embodiment, R1 is selected from the group consisting of a hydrogen and a substituted or unsubstituted alkyl group, a hydrogen and a C1 to C6 unsubstituted alkyl group being more preferred, a hydrogen being the most preferred. In a further preferred embodiment, L represents a divalent linking group comprising 2 to 8 carbon atoms, 2 to 6 carbon atoms being more preferred. In another preferred embodiment, R2, R3 and R4 independently represent a substituted or unsubstituted alkyl group, a C1 to C6 unsubstituted alkyl group being more preferred, a methyl, an ethyl and a propyl group being the most preferred.

In another preferred embodiment, the pigment can be dispersed by a polymeric dispersant or a surfactant including a cationic group. Preferably at least some of these monomer units of the polymeric dispersant comprises a cationic group or an ionisable group leading to a positive charge. Additional examples thereof may include those obtained by polymerization of a vinyl monomer and having a cationic nature in at least a part of the resulting polymer. Examples of a cationic monomer for forming the cationic moiety include salts of such tertiary amine monomers as described below, and quaternized product thereof. Namely, there are mentioned: 4-N,N-dimethylaminomethylstyrene, N,N-dimethylaminoethyl methacrylate, N,N-dimethyl-aminoethyl acrylate, N,N-dimethylaminopropyl methacrylate and N,N-dimethylaminopropyl acrylate.

Other suitable polymers are made via radical polymerisation using e.g. vinyl monomers such as: vinylbenzyl amine, vinyl phenylamine, 2-vinylpyridine, 4-vinylpyridine, p-aminostyrene, vinylpiperidine, vinyl imidazole. Preferably a copolymer of styrene and trialkyl-[(4-vinylphenyl)methyl]ammonium chloride, trialkyl-[(3-vinylphenyl)methyl]ammonium chloride or mixtures thereof is used as polymeric dispersant, more preferably the alkyl being a $C_1$ to $C_4$, most preferred the alkyl group being an ethyl group. Copolymers of styrene are particularly useful for dispersing black pigments because of the relative high aromatic character of the polymeric dispersant matching the hydrophobic character of the pigment surface.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer BI90plus based upon the principle of dynamic light scattering. The ink is diluted with demi water to a pigment concentration of 0.002 wt %. The measurement settings of the BI90plus are: 5 runs at 23° C., angle of 90°, wavelength of 635 nm and graphics=correction function.

However, for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL demi water and mixed until a homogenous sample was obtained. The measured particle size is the average value of 3 consecutive measurements consisting of 6 runs of 20 seconds.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

A.3. Solvent

The one or more organic solvents may be added to the ink formulation for a variety of reasons. For example, it can be advantageous to add a small amount of an organic solvent to improve the dissolution of a compound in the aqueous medium. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-propanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

The aqueous medium may contain a humectant to prevent the clogging of nozzles if the liquid containing the capsules is to be applied via jetting. The prevention is due to its ability to slow down the evaporation rate of the inkjet ink, especially the water in the ink. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

A.4. Additives

The aqueous ink may contain a surfactant. Any known surfactant may be used but preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2,4,7,9-tetramethyl-5-decine-4,7-diol, alkylene oxide adducts of 2,4,7,9-tetramethyl-5-decine-4,7-diol, 2,4-dimethyl-5-decin-4-ol, and alkylene oxide adducts of 2,4-dimethyl-5-decin-4-01. These are available, for example, from Air Products (GB) as Olfine (registered trademark) 104 series and E series, such as Olfine E1 010, or from Nissin Chemical Industry as Surfynol (registered trademark) 465 and Surfynol 61.

A biocide may be added to the aqueous ink to prevent unwanted microbial growth, which may occur in the liquid over time. The biocide may be used either singly or in combination. Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the total weight of the liquid.

The aqueous ink may further comprise at least one thickener for viscosity regulation in the liquid. Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly (acrylic acid), poly(vinyl alcohol), partially hydrolyzed poly (vinyl acetate), poly(hydroxyethyl acrylate), poly(methyl vinyl ether), polyvinylpyrrolidone, poly(2-vinylpyridine), poly(4-vinylpyridine) and poly(diallyldimethylammonium chloride)

The thickener is added preferably in an amount of 0.01 to 20 wt. %, more preferably 0.1 to 10 wt. % based on the liquid.

The aqueous ink may contain at least one pH adjuster. Suitable pH adjusters include organic amines, NaOH, KOH, NEt$_3$, NH$_3$, HCl, HNO$_3$ and H$_2$SO$_4$. In a preferred embodiment, the ink has a pH lower than 7. A pH of 7 or less can advantageously influence the electrostatic stabilization of the capsules, especially when the dispersing groups are amines.

The aqueous ink may also contain an optothermal converting agent, which may be any suitable compound absorbing in the wavelength range of emission by an infrared light source. The optothermal converting agent is preferably an infrared dye as this allows easy handling into the inkjet ink. The infrared dye may be included into the aqueous medium, but is preferably included in the core of the capsule. In the latter, the heat transfer is usually much more effective.

Suitable examples of infrared dyes are disclosed in [0179] of WO2015158649. The one or more optothermal converting agents are preferably present in the range of 0.1 to 10 wt % based on the total weight of the inkjet ink.

B. Inkjet Printing Method

Printing methods for textile printing using the aqueous ink according to the invention, include at least the steps of: a) applying the aqueous ink according to the invention onto a fabric; and b) applying heat and/or light to form a reaction product from the one or more chemical reactants in the capsules. The application of the aqueous ink is preferably done image wise and is preferably performed via a jetting process.

In the digital textile printing process of the invention, the textile fabric used is made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres.

In a first step of the digital textile printing method, a pre-treatment liquid may be applied to the fabric by spraying, coating, or pad printing. Alternatively, a pre-treatment liquid may also be applied to fabric using an ink jet head or valve jet head.

In another embodiment of the method according to the invention, a fabric already having a pre-treatment may be provided before applying the aqueous ink.

Fabric to which the pre-treatment liquid has been applied may be dried and optionally undergo a heat treatment, before the subsequent ink jetting step with colorant containing ink. The heat treatment is preferably at 110 to 200° C., more preferably 130 to 180° C. Examples of the heating process include, but are not limited to, heat press, atmospheric steaming, high-pressure steaming, and THERMOFIX. Any heat source can be used for the heating process; for example, an infrared ray lamp is employed.

After the ink application step, the printed fabric is dried and heated. The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step of the fabric is carried at a temperature preferably below 150° C., more preferably below 100° C., most preferably below 80° C. The heating step is preferably at 110 to 200° C., more preferably 130 to 160° C. The heating temperature is preferably chosen such as to activate the chemical reactants capable of forming a reaction product upon application of heat, preferably the thermally reactive cross-linker, more preferably the blocked isocyanate.

Another embodiment of the inkjet printing method according to the present invention includes at least the steps of: a) jetting an inkjet ink comprising a colorant and the capsules of the invention onto a substrate; and b) applying heat and/or light to form a reaction product from the one or more chemical reactants in the capsules. Suitable substrates are textile fabrics, leather, glass, ceramic, metallic, glass, wood, paper or polymeric surfaces. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 $g/cm^3$ or more.

A preferred ink jet head for the inkjet printing system is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the ink jet head. However the jetting of the ink according to the present invention is not restricted to piezoelectric inkjet printing. Other inkjet print heads can be used and include various types, such as a continuous type, a thermal print head type and a valve jet type.

If an optothermal converting agent is present in the nanocapsules of the invention, the heating mains may be a suitable light source. If the optothermal converting agent consists of one or more infrared dyes, an infrared light source is used. Any infrared light source may be used, as long as at least part of the emitted light is suitable for activating the thermally reactive crosslinker. The infrared curing means may include an infrared laser, an infrared laser diode, infrared LEDs or a combination thereof.

EXAMPLES

1. Materials

Special black 550 is a carbon black pigment supplied by Orion Engineered Carbons Desmodur N75 BA is a trifunctional isocyanate supplied by Bayer AG.

Trixene BI7963 is a malonate blocked isocyanate supplied by Baxenden Chemiclas LTD).

CATSURF-1, cationic surfactant synthesized as follows: 58 g (0.21 mol) (3-acrylamidopropyl)trimethylammonium chloride (supplied as 75 W % in water) was dissolved in 150 g isopropanol. A mixture of 27 g (0.1 mol) octadecyl amine, 24.1 g (0.1 mol) hexadecyl amine and 30 g (0.148 mol) triethyl amine were added and the mixture was heated to 80° C. for 24 hours. The solvent was removed under reduced pressure.

CATPOL-1, cationic dispersant synthesized as follows: 76.3 g (0.5 mol) 4-chloromethyl-styrene and 55.5 g (0.55 mol) triethyl amine were dissolved in 375 g acetonitrile. The mixture was refluxed for 6 hours. The reaction was monitored using TLC (Reveleris RP C18 TLC plates, supplied by Grace, eluent MeOH/water 60/40, $R_f$: 0.38). After 6 hours, the conversion was completed. The 27.6 w % solution of triethyl-[(4-vinylphenyl)methyl]ammonium chloride in acetonitrile was used directly in the synthesis of CATPOL-1. To 36.2 g of the above prepared solution, a solution of 9.8 g (94 mmol) styrene and 0.2 g (0.85 mmol) (1,1-dimethyl-3-phenyl-but-3-enyl)benzene and 0.6 g WAKO V601 in 14 g acetonitrile was added. The mixture was flushed with nitrogen and heated to 80° C. for 24 hours. The conversion of triethyl-[(4-vinylphenyl)methyl]ammonium chloride was 90% based on TLC analysis. An additional 0.6 g WAKO V601 was added and the mixture was heated for an additional 24 hours at 80° C. Based on TLC analysis, the conversion was almost complete. The reaction mixture was allowed to cool down to room temperature and added to 400 ml methyl t.butyl ether. The mixture was stirred for 1 hour. CATPOL-1 was isolated by filtration and dried. 19.5 g of CATPOL-1 was isolated.

2. Measuring Methods 2.1. Particle Size Measurement

The average particle size of the nanocapsules was measured using a Zetasizer™ Nano-S (Malvern Instruments, Goffin Meyvis).

2.2. Storage Stability

The storage stability of the aqueous inks is evaluated by keeping the inks in glass test tubes for 7 days at 60° C. and visually inspect the inks in the tubes.

3. Preparation of Dispersions 3.1. Synthesis of Comparative Nanocapsule Dispersion CAPCAT-1

A solution of 22 g Desmodur N75 BA and 23 g Trixene BI7963 in 36 g ethyl acetate was prepared. A solution of 6.5 g CATSURF-1 and 30 g glycerol in 55 g water was prepared by heating the mixture to 90° C. The aqueous solution was allowed to cool down to room temperature. The ethyl acetate solution was added to the aqueous solution while stirring for 5 minutes using an Ultra-Turrax at a rotation speed of 18000 rpm. An additional 80 g water was added. The ethyl acetate was evaporated at 65° C. under reduced pressure, while gradually increasing the vacuum from 500 mbar to 120 mbar. The weight of the dispersion was adjusted to 145 g by evaporating water at 120 mbar. The dispersion was stirred for 16 hours at 65° C. The dispersion was allowed to cool down to room temperature and the dispersion was filtered over a 1.6 μm filter.

The average particle size was 192 nm.

3.2. Synthesis of Inventive Nanocapsule Dispersion CAPCAT-2

A solution of 22 g Desmodur N75 BA and 23 g Trixene BI7963 in 36 g ethyl acetate was prepared. A solution of 5.8 g CATSURF-1 and 30 g glycerol in 55 g water was prepared by heating the mixture to 90° C. The aqueous solution was allowed to cool down to room temperature. The ethyl acetate solution was added to the aqueous solution while stirring for 5 minutes using an Ultra-Turrax at a rotation speed of 18000 rpm. 50 g ice was added followed by the dropwise addition of a solution of 1.5 g tetra-ethylene pentamine in 40 g water at 0° C. The mixture was stirred for an additional five minutes. The ethyl acetate was evaporated at 60° C. under reduced pressure, while gradually increasing the vacuum from 500 mbar to 120 mbar. The weight of the dispersion was adjusted to 150 g by evaporating water at 120 mbar. The dispersion was stirred for 16 hours at 65° C. The dispersion was allowed to cool down to room temperature and the dispersion was filtered over a 1.6 μm filter.

The average particle size was 165 nm.

3.3. Preparation of the Colorant Dispersion CATDISP.

A mixture of 3 g Special black 550, 16 g water, 1 g CATPOL-1 and 100 g Yttrium stabilized zirconium oxide beads (0.4 mm) was milled for 5 days. The Yttrium stabilized zirconium oxide beads were removed by filtration 1. The average particle size was 135 nm.

4. Preparation of the Aqueous Inks

The aqueous inks CATINK-1 and CATINK-2 were prepared by mixing the components according to Table 2. All weight percentages are based on the total weight of the ink jet ink.

TABLE 2

| Component | CATINK-1 (COMP) Wt. % | CATINK-2 (INV) Wt. % |
|---|---|---|
| CATDISP | 24 | 25 |
| CAPCAT-1 | 38 | — |
| CAPCAT-2 | — | 40 |
| 1,2-propane diol | 17.5 | 17.5 |
| glycerol | 10 | 10 |
| water | 7.5 | 7.5 |

The ink was stirred for 5 minutes and filtered over a 1.6 μm filter.

The storage stability of the inks was evaluated as described in § 2.2 of the Example-section. CATINK-1 showed particles which were visible with the naked eye. These particles will lead to jetting reliability problems if used in an inkjet printing device. CATINK-2 did not show particles, visible with the naked eye.

The invention claimed is:

1. An aqueous ink comprising,
   capsules comprising a polymeric shell surrounding a core,
      the core comprises one or more chemical reactants capable of forming a reaction product upon application of heat and/or radiation,
      wherein, each capsule is obtainable by:
         dispersing under high shear a non-aqueous solution in an aqueous solution and adding a polyamine compound having at least three nucleophilic groups to the dispersion,
         wherein the non-aqueous solution comprises i) a compound selected from the group consisting of di- or poly-acid chlorides, di- or oligoisocyanates, di- or oligosulfochlorides, di- or oligochloroformates, an isocyanate monomer, and mixtures thereof; ii) one or more chemical reactants capable of forming a reaction product upon application of heat and/or radiation; and iii) a water-immiscible solvent having a boiling point below 100° C. at normal pressure,
         wherein the aqueous solution comprises a surfactant comprising a quaternary ammonium group and at least one primary or secondary amine to covalently bond the surfactant to the polymeric shell; and
   a colorant stabilized by cationic dispersing groups.

2. The aqueous ink according to claim 1, wherein the polyamine compound is an alkylene pentamine.

3. The aqueous ink according to claim 1, wherein the surfactant has a structure as according to Formula I

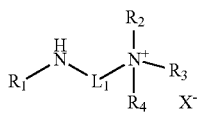

Formula I wherein
R$_1$ is selected from the group consisting of a substituted or unsubstituted alkyl group, a substituted or unsubstituted alkenyl group and a substituted or unsubstituted alkynyl group with the proviso that R$_1$ comprises at least eight carbon atoms;

R$_2$, R$_3$ and R$_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group;

L$_1$ represents a divalent linking group comprising no more than eight carbon atoms; and X represents a counterion to compensate the positive charge of the ammonium group.

4. The aqueous ink according to claim 1, wherein the one or more chemical reactants is a thermally reactive cross-linker.

5. The aqueous ink according to claim 3, wherein the one or more chemical reactants is a thermally reactive cross-linker.

6. The aqueous ink according to claim 4, wherein the thermally reactive cross-linker is a blocked isocyanate.

7. The aqueous ink according to claim 5, wherein the thermally reactive cross-linker is a blocked isocyanate.

8. The aqueous ink according to claim 1, wherein the colorant is a pigment.

9. The aqueous ink according to claim 3, wherein the colorant is a pigment.

10. The aqueous ink according to claim 7, wherein the colorant is a pigment.

11. The aqueous inkjet ink according to claim 1, further comprising a water-soluble organic solvent.

12. The aqueous inkjet ink according to claim 10, further comprising a water-soluble organic solvent.

13. A digital textile printing method comprising the steps of:
a) applying, to a textile fabric, the aqueous ink as defined in claim 4, and
b) applying heat to activate the thermally reactive cross-linker.

14. The printing method according to claim 13, wherein the aqueous ink is applied by a jetting technique.

15. A method for preparing an aqueous dispersion of a capsule as defined in claim 1, including the steps of:
a) preparing a non-aqueous solution of i) a compound selected from the group consisting of di- or poly-acid chlorides, di- or oligoisocyanates, di- or oligo-sulfochlorides, di- or oligo-chloroformates, an isocyanate monomer, and mixtures thereof and ii) one or more chemical reactants capable of forming a reaction product upon application of heat and/or radiation in a water immiscible solvent having a boiling point below 100° C. at normal pressure;
b) preparing an aqueous solution of a surfactant comprising a quaternary ammonium group and at least one primary or secondary amine to covalently bond the surfactant to a polymeric shell;
c) dispersing the non-aqueous solution under high shear in the aqueous solution;
d) adding a polyamine compound having at least three nucleophilic groups to the dispersion; and
e) optionally stripping the organic solvent from the dispersion.

16. The method for preparing an aqueous dispersion of a capsule according to claim 15, wherein the surfactant is according to Formula I

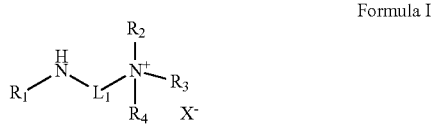

Formula I wherein
R$_1$ is selected from the group consisting of a substituted or unsubstituted alkyl group, a substituted or unsubstituted alkenyl group and a substituted or unsubstituted alkynyl group with the proviso that R$_1$ comprises at least eight carbon atoms;

R$_2$, R$_3$ and R$_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group;

L$_1$ represents a divalent linking group comprising no more than eight carbon atoms; and X represents a counterion to compensate the positive charge of the ammonium group.

* * * * *